(12) United States Patent
Todero

(10) Patent No.: US 7,398,759 B2
(45) Date of Patent: Jul. 15, 2008

(54) FOUR-STROKE ENGINE

(75) Inventor: Giuseppe Todero, Mandello Lario (IT)

(73) Assignee: Husqvarna AB, Huskvarna (SE)

( * ) Notice: Subject to any disclaimer, the term of this patent is extended or adjusted under 35 U.S.C. 154(b) by 212 days.

(21) Appl. No.: 10/547,580

(22) PCT Filed: Mar. 17, 2003

(86) PCT No.: PCT/SE03/00453
§ 371 (c)(1),
(2), (4) Date: Jun. 21, 2006

(87) PCT Pub. No.: WO2004/083614
PCT Pub. Date: Sep. 30, 2004

(65) Prior Publication Data
US 2006/0249119 A1 Nov. 9, 2006

(51) Int. Cl.
F02B 75/02 (2006.01)
F01L 1/26 (2006.01)

(52) U.S. Cl. ............. 123/317; 123/90.23

(58) Field of Classification Search ........ 123/317, 123/311, 318, 70 R, 71 R, 90.23, 196 R, 123/73 V, 65 VC, 65 VD, 65 V, 73 PP, 73 AB
See application file for complete search history.

(56) References Cited

U.S. PATENT DOCUMENTS

| 4,708,107 | A | | 11/1987 | Stinebaugh |
| 5,072,699 | A | * | 12/1991 | Pien ............ 123/65 VC |
| 5,347,967 | A | | 9/1994 | Todero et al. |
| 5,579,735 | A | | 12/1996 | Todero et al. |
| 6,145,484 | A | | 11/2000 | Funakoshi et al. |
| 6,152,098 | A | | 11/2000 | Becker et al. |
| 6,167,874 | B1 | | 1/2001 | Becker et al. |
| 6,199,532 | B1 | | 3/2001 | Häberlein et al. |
| 6,216,660 | B1 | * | 4/2001 | Ryu et al. ............ 123/196 W |
| 6,401,701 | B1 | | 6/2002 | Liu |
| 6,484,701 | B1 | | 11/2002 | Liu |
| 7,066,140 | B2 | * | 6/2006 | Emanuelsson et al. ...... 123/317 |
| 7,096,844 | B2 | * | 8/2006 | Kawamoto et al. .... 123/196 CP |
| 7,096,850 | B2 | * | 8/2006 | Yashirodai et al. ........ 123/317 |
| 7,270,110 | B2 | * | 9/2007 | Keoppel .............. 123/317 |
| 7,325,526 | B2 | * | 2/2008 | Kawamoto ............ 123/196 R |

FOREIGN PATENT DOCUMENTS

| DE | 30 22 901 | 12/1981 |
| DE | 34 38 031 | 4/1986 |
| EP | 1 134 365 | 9/2001 |
| EP | 1 136 665 | 9/2001 |

* cited by examiner

Primary Examiner—Stephen K. Cronin
Assistant Examiner—Hyder Ali
(74) Attorney, Agent, or Firm—Pearne & Gordon LLP

(57) ABSTRACT

A four-stroke reciprocating piston internal combustion engine with an intake valve an exhaust valve and a valve drive assembly (18) driven by the crankshaft (4) for actuating the intake valve (8) and the exhaust valve (10) A mixture-preparation device (15) supplies an air/fuel-lubricant mixture to the crankcase, which together with the piston functions as a pump for the mixture charge. A valve drive assembly housing (19, 20, 21, 22) comprising one or more sections (19, 20, 21, 22) and the intake channel (16) is supplied with a connecting duct (17) communicating with the crankcase volume (12) either by being connected to the crankcase or the cylinder, or by being connected to the valve drive assembly housing (19, 20, 21, 22), which communicates with the crankcase volume (12), and the communication from the intake channel (16) to the crankcase volume is arranged through at least one valve.

20 Claims, 11 Drawing Sheets

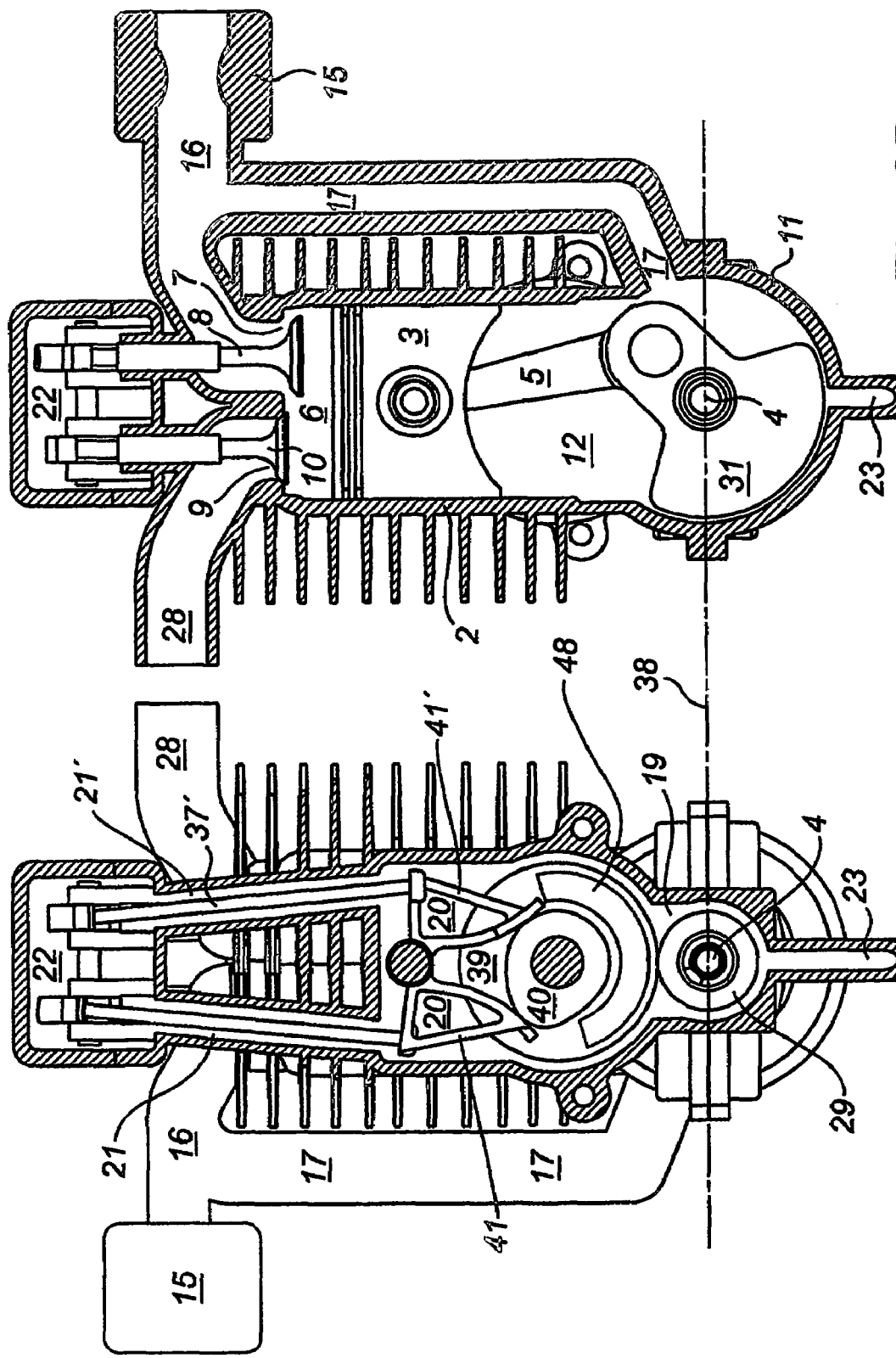

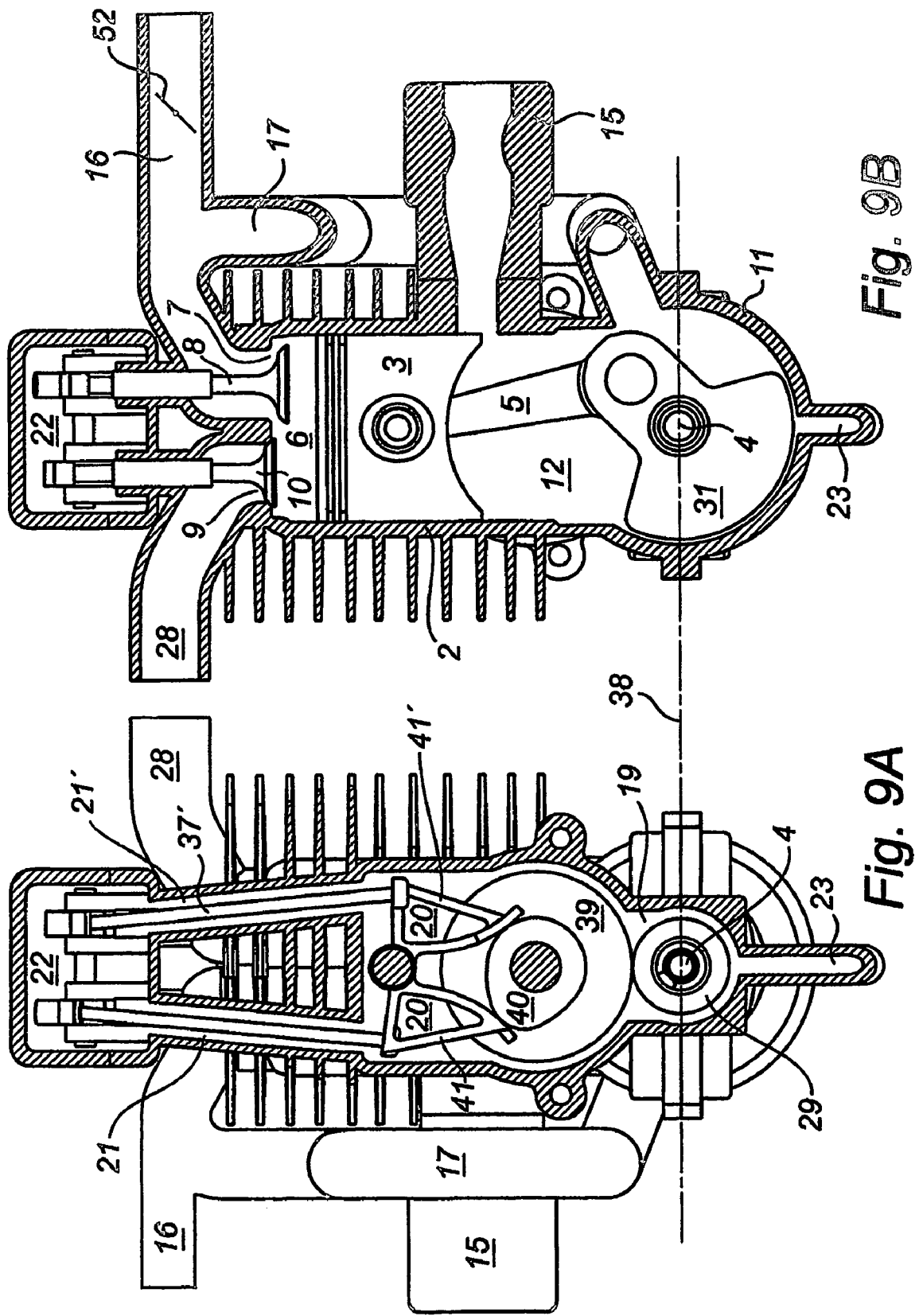

FOUR-STROKE ENGINE

TECHNICAL FIELD

The subject invention refers to a four-stroke engine according to the preamble of claim 1. It is primarily intended for a portable tool such as a chain saw, a trimmer or a power cutter.

BACKGROUND OF THE INVENTION

Portable tools such as chain saws or power cutters are used in many different handling positions, even upside down. They are therefore usually crankcase scavenged and lubricant, e.g. oil is supplied to the crankcase. This lubrication system works in every handling position. These engines are usually of two-stroke type, but also four-stroke engines have been suggested.

U.S. Pat. Nos. 4,708,107, 5,347,967, 5,579,735 and 6,145,484 and DE 30 22 901 show crankcase scavenged oil in fuel four-stroke engines. A flow is arranged via the valve drive assembly housing into the combustion chamber via the intake valve. This system provides good lubrication but gives a strong heating of the intake air being in contact with very hot engine parts, e.g. valve stems. This reduces the power output. This applies also for a part flow in U.S. Pat. No. 6,401,701, see FIGS. 3 and 6 and DE 34 38 031. This reduces the power loss but it requires a complex structure of the intake system.

There are also designs that are not crankcase scavenged and lubricated. In these designs an oil sump or tank is filled with oil to a recommended oil level. Therefore there is no need to supply oil to the fuel. But instead they need an oil tank or oil sump of considerable size. This tank or sump usually reaches well below the level of the crankcase. Therefore the size and the weight of the engine is increased considerably. Examples are EP 1 134 365 and EP 1 136 665. They also use special extra parts for creating oil mist.

U.S. Pat. No. 6,152,098 shows a design with an oil sump of considerable size reaching down well below the crankcase. It is to be filled with oil to a prescribed level. Weight and size is somewhat reduced compared to the EP application-designs above, but is still a problem. The engine is crankcase scavenged using pure fuel, i.e. not mixed with oil.

U.S. Pat. No. 6,145,484 shows some versions (see FIGS. 6 and 7) that are not crankcase scavenged but have ducts leading from the intake duct both to the crankcase and to the valve drive assembly in a complex manner.

U.S. Pat. No. 6,199,532 shows an engine wherein a connecting channel is arranged between the top section of the valve drive housing and the intake duct. The flow connections from the crankcase to the intake channel are free from valves and control elements. This system is simple but vulnerable to pumping in the crankcase making fuel and lubricant flow back to the carburettor and air filter, a so called back spit.

PURPOSE OF THE INVENTION

The purpose of the subject invention is to substantially reduce the above outlined problems and to achieve advantages in many respects.

SUMMARY OF THE INVENTION

The above-mentioned purpose is achieved in a four-stroke engine in accordance with the invention having the characteristics appearing from the appended claims. The crankcase scavenged engine in accordance with the invention is thus essentially characterized in that it further comprises: a valve drive assembly housing comprising one or more sections, and the intake channel is supplied with a connecting duct communicating with the crankcase volume, either by being connected to the crankcase or cylinder, or by being connected to the valve drive assembly housing, which communicates with the crankcase volume, and the communication from the intake channel to the crankcase volume is arranged through at least one valve. This means that there is no flow through the valve drive assembly housing into the combustion chamber. Therefore the intake air is essentially not heated by very hot parts of the engine. This increases power output.

The use of a valve in the communication from the intake channel to the crankcase volume means that back spit to the carburettor and the air filter can be avoided. Most preferable is a valve that opens and shuts once per engine cycle. This is not the case for a piston ported valve or a check valve or a rotary valve constituted by the crank mechanism. But it is for a valve constituted by parts driven by the camshaft, e.g. a rotary valve, as described in some embodiments.

In some embodiments the connecting duct is connected to the crankcase or cylinder, and the valve drive assembly housing is in communication exclusively with the crankcase volume. This means that the two flow systems are separate and can be optimised separately, e.g. choice of valve type, choice of flow restrictions etc.

Further characteristics and advantages of the invention will be apparent from the description of preferred embodiments. The embodiments can be combined.

BRIEF DESCRIPTION OF THE DRAWINGS

The invention will be described in closer detail in the following by way of various embodiments thereof, with reference to the accompanying drawing figures in which the same numbers in the different figures state one another's corresponding parts. For convenience up and down in the engine refers to up and down in the drawing figures. The engine can be arranged in various positions in different products and these products can be used in different positions.

FIGS. 3A and 3B show two important cross-section views of the engine side by side. The crankcase volume and the valve drive assembly housing and its different sections with the valve drive assembly appears clearly.

FIGS. 9A and 9B show a second embodiment of an overhead valve engine, an OHV-engine, comparable to the engine of FIG. 1-5. An intake duct has been added connecting to the crankcase or cylinder and supplied with a mixture preparation device.

DESCRIPTION OF PREFERRED EMBODIMENTS

Figure 1:
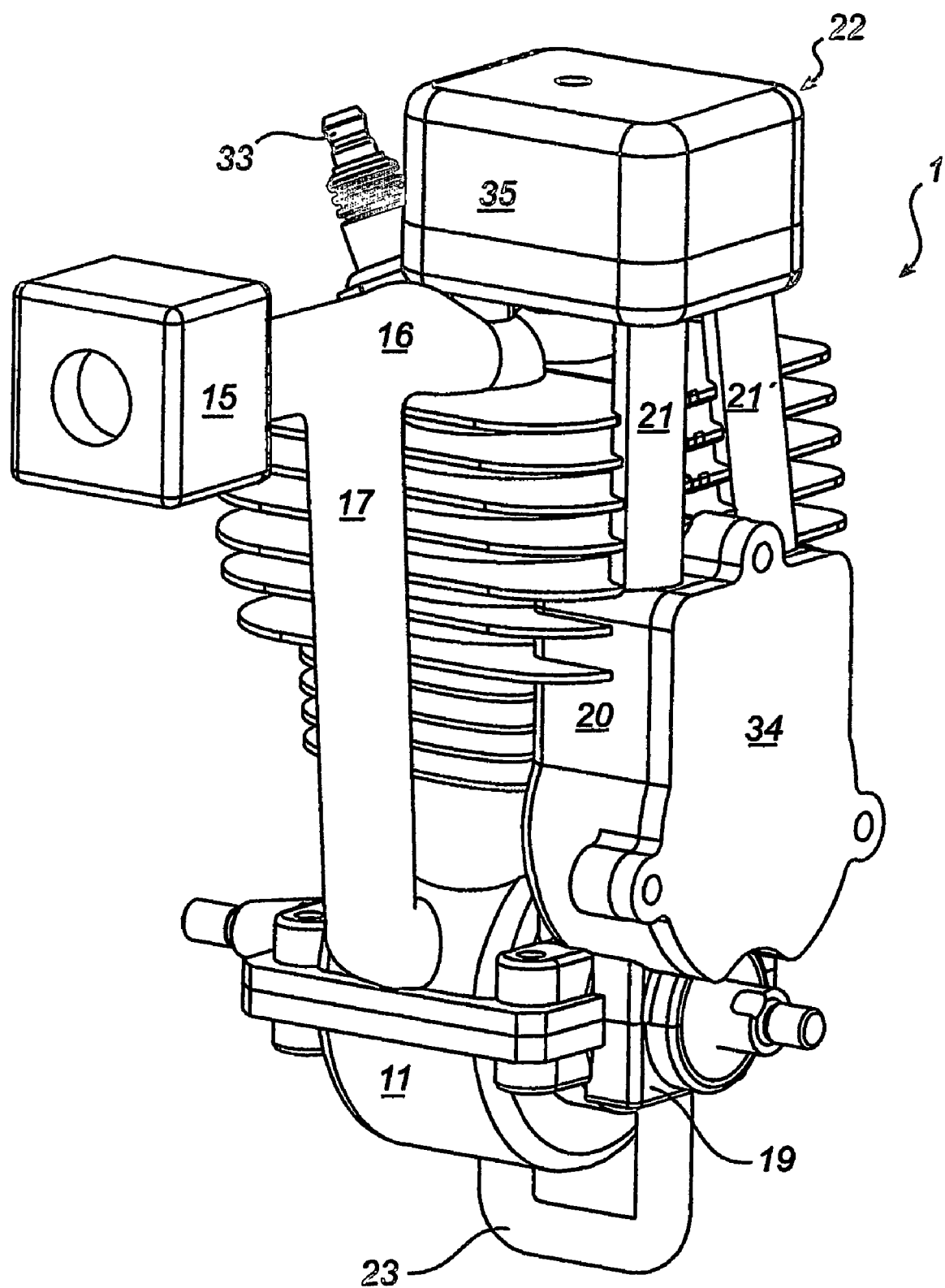
FIG. 1 is a perspective view of a four-stroke engine according to the invention. It shows the main parts of the engine and especially the valve drive assembly housing and its different sections.

FIG. 1 shows a crankcase scavenged four-stroke engine 1 according to the invention as seen in a perspective view. The engine has a cylinder 2 with cooling fins 32 and a spark plug 33. A crankcase 11 is connected below the cylinder 2. An intake channel 16 connects to an intake opening (7) with intake valve (8). A mixture preparation device 15 for supplying preferably an air-fuel-lubricant mixture is arranged to the intake channel 16. It supplies at least air 13 and lubricant 14 to the intake and to a connecting duct 17. This is described more fully referring to FIGS. 3A and 3B. A valve drive assembly 18 is enclosed in a valve drive assembly housing 19, 20, 21, 21', 22.

A passage 23 is connected between the crankcase 11 and the lowest section 19 of the valve drive assembly housing. The second lowest section of the valve drive assembly housing 20 is covered by a lid 34. The top section 22 of the assembly housing is connected to the lower sections 20, 19 through tubes 21, 21', and is covered by a lid 35.

Figure 2:
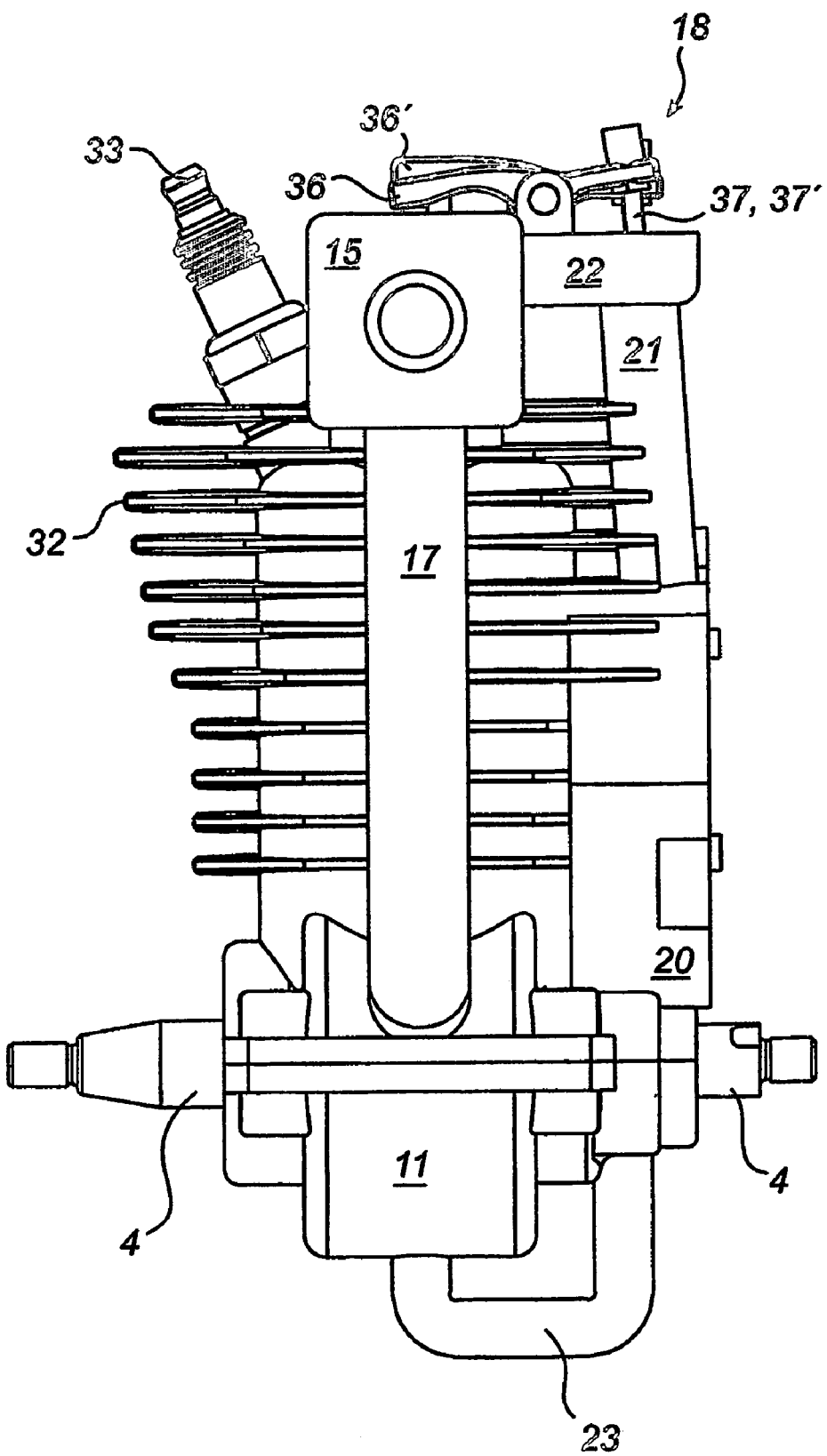
FIG. 2 is a side view of the engine according to FIG. 1. Two lids have been lifted off.

FIG. 2 shows a view from the side of the engine according to FIG. 1. The lid 34 has been removed. Also the lid 35 of the top section 22 has been removed. A part of the valve drive assembly 18 is thereby shown. Two rocker arms 36, 36' are shown as well as two push rods 37, 37'. A crankshaft 4 is also visible in both ends protruding out of the crankcase 11.

In FIGS. 3A and 3B the two most important sections of the engine are shown. The two sections are shown side by side and the crankshaft 4 is lying on the axis 38. FIG. 3B shows the engine cylinder 2 with a piston 3 movably mounted in the cylinder in order to rotatibly drive the crankshaft 4 via a connecting rod 5. The cylinder and the piston conjointly delimit a combustion chamber 6. The cylinder having an intake opening 7 and an intake valve 8 for opening and closing the intake opening. The cylinder has an exhaust opening 9 and an exhaust valve 10 for opening and closing the exhaust opening, followed by an exhaust duct 28. The intake channel 16 having a branching connecting duct 17, connecting to the crankcase or cylinder, is clearly shown as the mixture preparation device 15. It supplies an air-fuel-lubricant mixture to the intake channel 16 and to the connecting duct 17 and is in the form of a carburettor or a low-pressure injection system. It could also supply only air and lubricant. In this case fuel is supplied after the branch into the intake channel 16 and mixed with air or maybe supplied directly into the combustion chamber 6. A two stage apparatus is thus possible. The crankshaft 4 has a crank mechanism 31, 31' connecting the crankshaft with a connecting rod 5. The connecting duct 17 is opened and shut by the crank mechanism 31, 31' forming a rotary valve together with the mouth of the connecting duct 17. A passage 23 connects the crankcase volume 12 with the valve drive assembly housing 19, 20, 21, 21', 22. This housing is shown clearly in FIG. 3A. The passage 23 coming from the crankcase 11 arrives at the lowest section 19 of the valve drive assembly housing. The next section or middle section 20 is connected to the top section 22 via the tubes 21, 21'.

A crankshaft gear wheel 29 is arranged on the crankshaft in the lowest section 19 of the valve drive assembly housing. This section has an approximate radius that is considerably smaller than the corresponding radius of the crankcase and can therefore not form an oil sump. A cooperating gear wheel 39 is supplied with a fixed cam 40. Two cam followers 41, 41' ride on this cam. They each have a push rod 37, 37' that drives the valves 8, 10 via the rocker arms 36, 36'. This is conventional and is therefore not further described.

Figure 7:
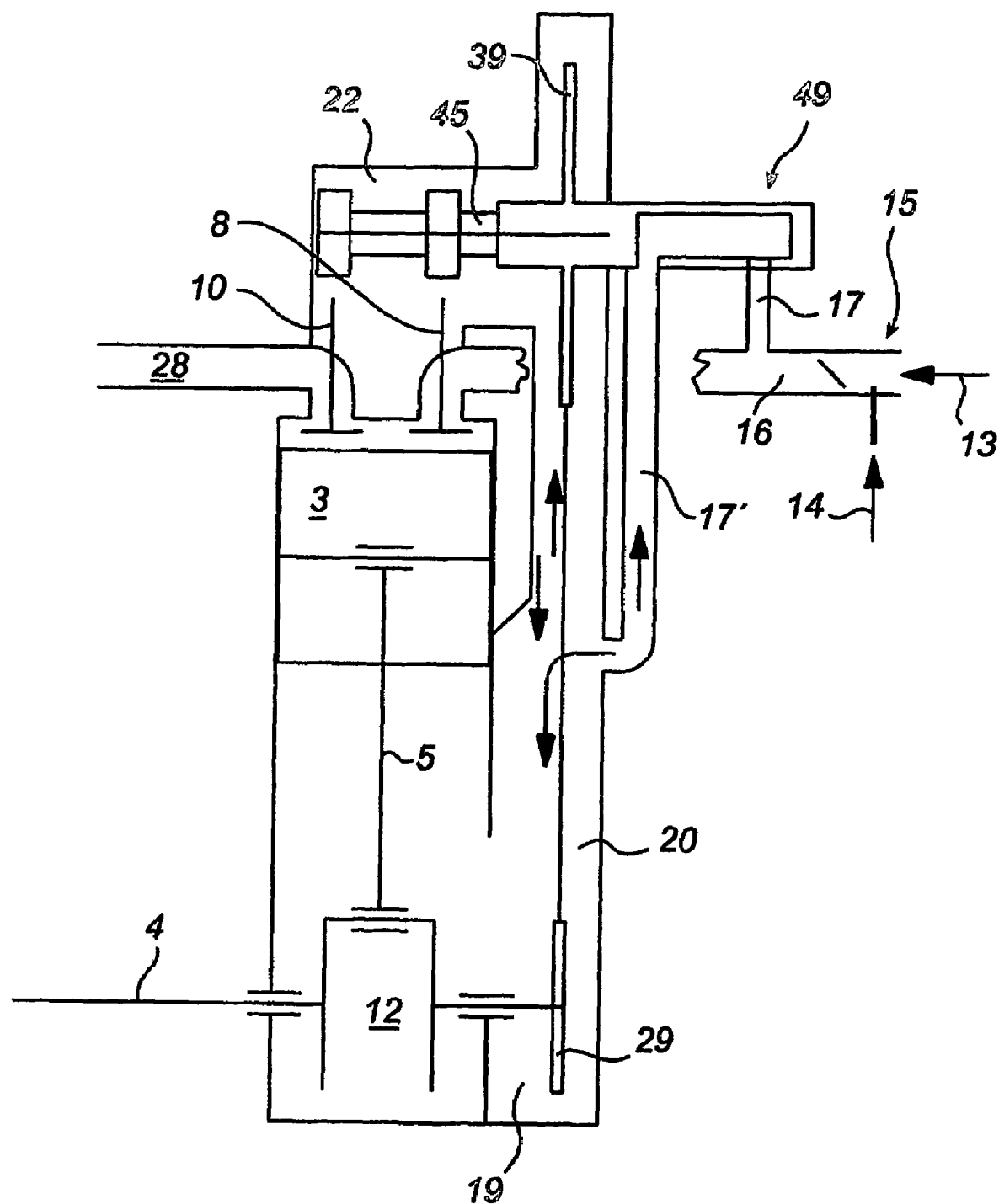
FIG. 7 shows in a schematic cross-section view a further alternative embodiment of an OHC-engine.
Figure 8:
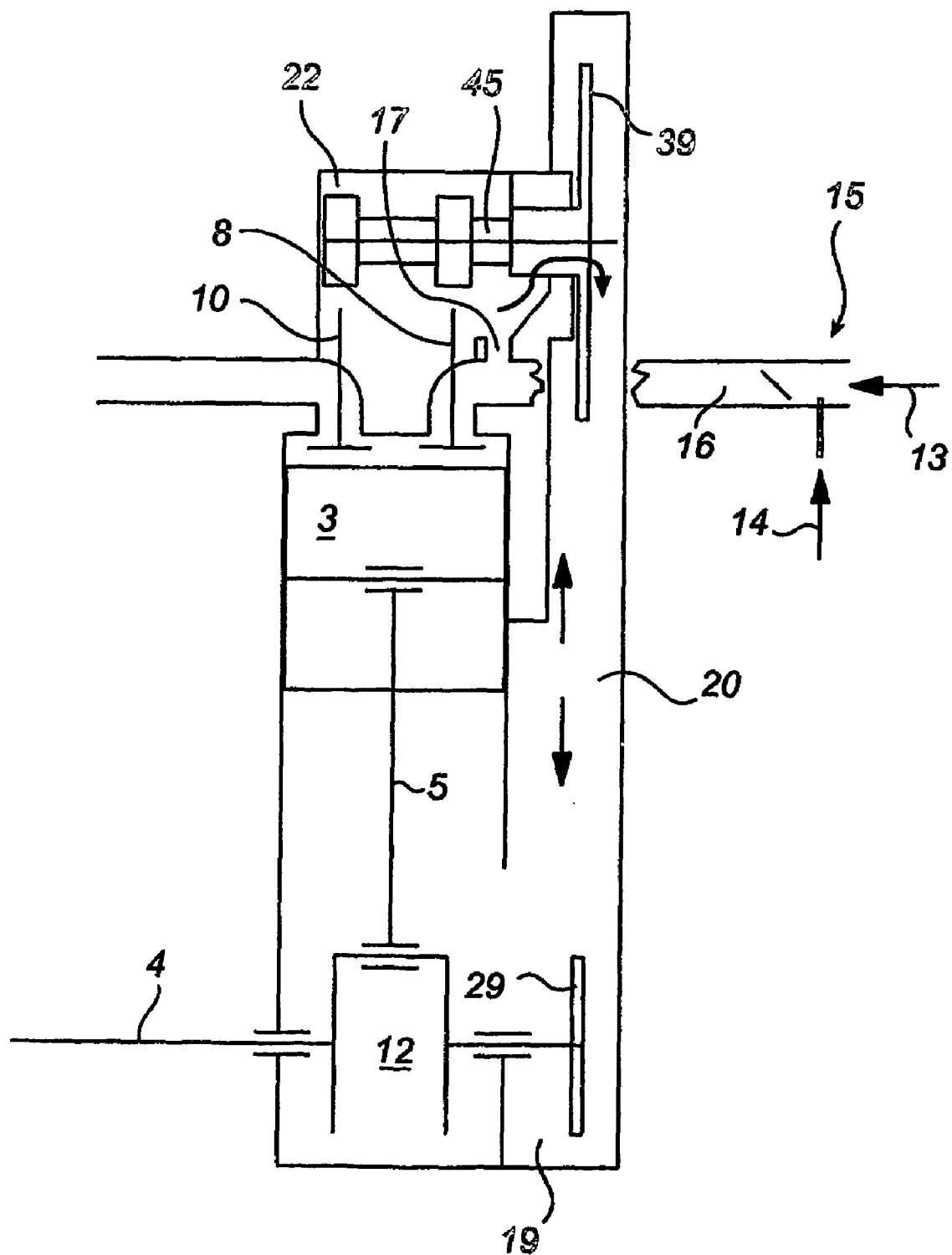
FIG. 8 shows a still further alternative embodiment of an OHC-engine.

However, a small size connection between the crankcase volume 12 and the valve drive assembly housing 19, 20, 21, 21', 22 is special. The valve drive assembly housing comprises one or more sections 19, 20, 21', 21', 22, which is/are separate from the crankcase volume but in communication exclusively with the crankcase volume through the passage 23. Through the pulsating pressure in the crankcase volume lubricant will move back and forth through the passage 23 and will lubricate all the sections 19, 20, 21, 21' and 22 of the valve drive assembly housing and its moving parts. This lubrication flow is separate from the flow in the connecting duct 17 and will be described in different versions. But there are also versions there the lubrication flow is not separate as outlined below. Further most embodiments describe a communication between the valve drive assembly housing 19, 20, 21, 22 and the crankcase volume 12 that is made 20 up by one or more passages of small size 23, 24, 25, 26, 27. This is usually an advantage considering the lubrication of the valve drive assembly. But the lubrication system would still work if the passage/s would have a considerable size, as seen in FIGS. 5, 7 and 8. In such an "open" system there would of course be no reason to choose a sealed bearing. Possibly the right bearing could also be located to the right side of the gear wheel or pulley 29. In this case there will not be a lower section 19 of the valve drive assembly housing. As can be clearly seen each section 19, 20, 21, 21', 22 of the valve drive assembly housing has a lowest part situated higher in the axial direction of the cylinder bore, i.e. closer to the combustion chamber than the lowest part of the crankcase. They can therefore not form an oil sump when the engine is operated in normal positions.

Figure 4A:
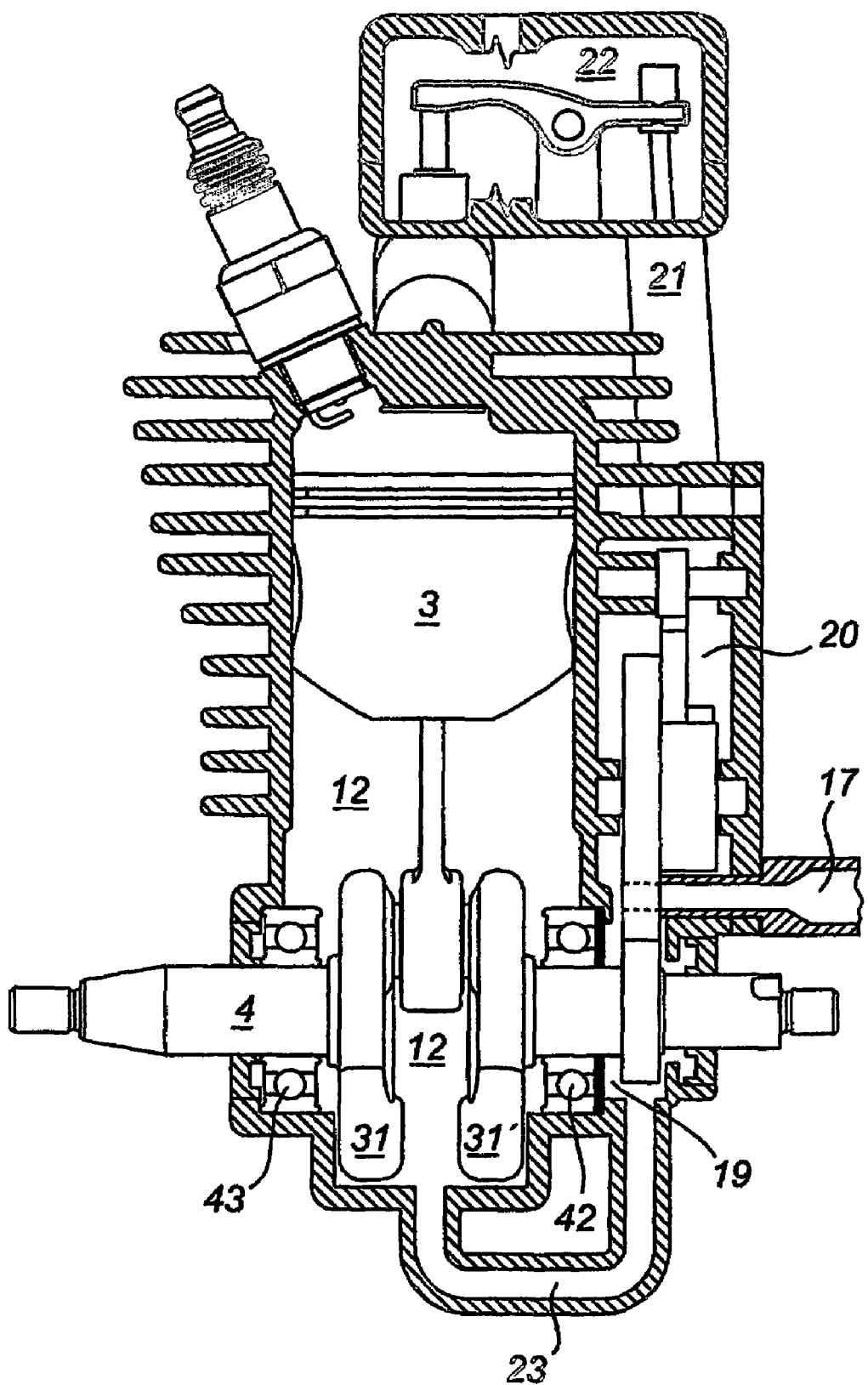
FIG. 4A shows a cross-section view of the engine according to FIG. 1-3 with a small size passage connecting the crankcase volume and the valve drive assembly housing, but with an alternative arrangement of the connecting duct being opened and shut by a camshaft driven rotary valve.

FIG. 4A shows one embodiment of a passage 23. The passage is arranged as a duct leading from the crankcase 11 to the lowest section 19 of the valve drive assembly housing. The passage 23 is free from valves and there is only a single passage free from valves. The passage 23 is of small size and has an area smaller than the cross-section area of an aperture with a diameter of 40% of the cylinder diameter and preferably smaller than 30% of the cylinder diameter. For lubrication purposes it could be preferable to have a very small cross-section area smaller than the cross-section of an aperture with a diameter of 20% of the cylinder diameter and preferably 10% of the cylinder diameter. But there can also be more than one passage. In this case the total cross-section area should be smaller than the cross-section area of the mentioned sizes. One or more passages can be arranged in many ways. As shown in FIG. 4A the right bearing 42, i.e. a bearing on the right side of the crank mechanism 31, 31', is sealed. Therefore it will not leak between the crankcase volume 12 and the valve drive assembly housing. The left bearing 43 is not sealed. If that kind of bearing would be used on the right side it would give considerable leakage between the volumes. But it could also be partly sealed to form a passage of suitable area. So the right bearing could be sealed, partly sealed or not sealed at all in order to contribute to form a total passage of suitable area. The connecting duct can connect either to the crankcase or cylinder as shown in FIG. 3B or to the valve drive assembly housing as shown in FIG. 4A. In the latter version the gear wheel 39 has a slot 48 as shown in FIG. 3A. The communication will open and close once per engine cycle, a distinct advantage to avoid back spit. The communication to and from the connecting duct 17 will have to use the passage 23. It is also used for the back and forth flow from the crankcase volume 12 to the valve drive assembly housing 19, 20, 21, 21' 22. This could be a disadvantage. But an advantage could be that the mouth of the connecting duct 17 will specifically provide lubricant to the rotating camshaft gear wheel. If the left side of the gear wheel would be sealed and a mating passage would be arranged through the crankcase the connecting duct 17, 17' would instead go straight through the housing section and reach the crankcase volume directly. And the passage 23 could be optimised exclusively for the lubrication of the valve gear assembly.

Figure 4B:
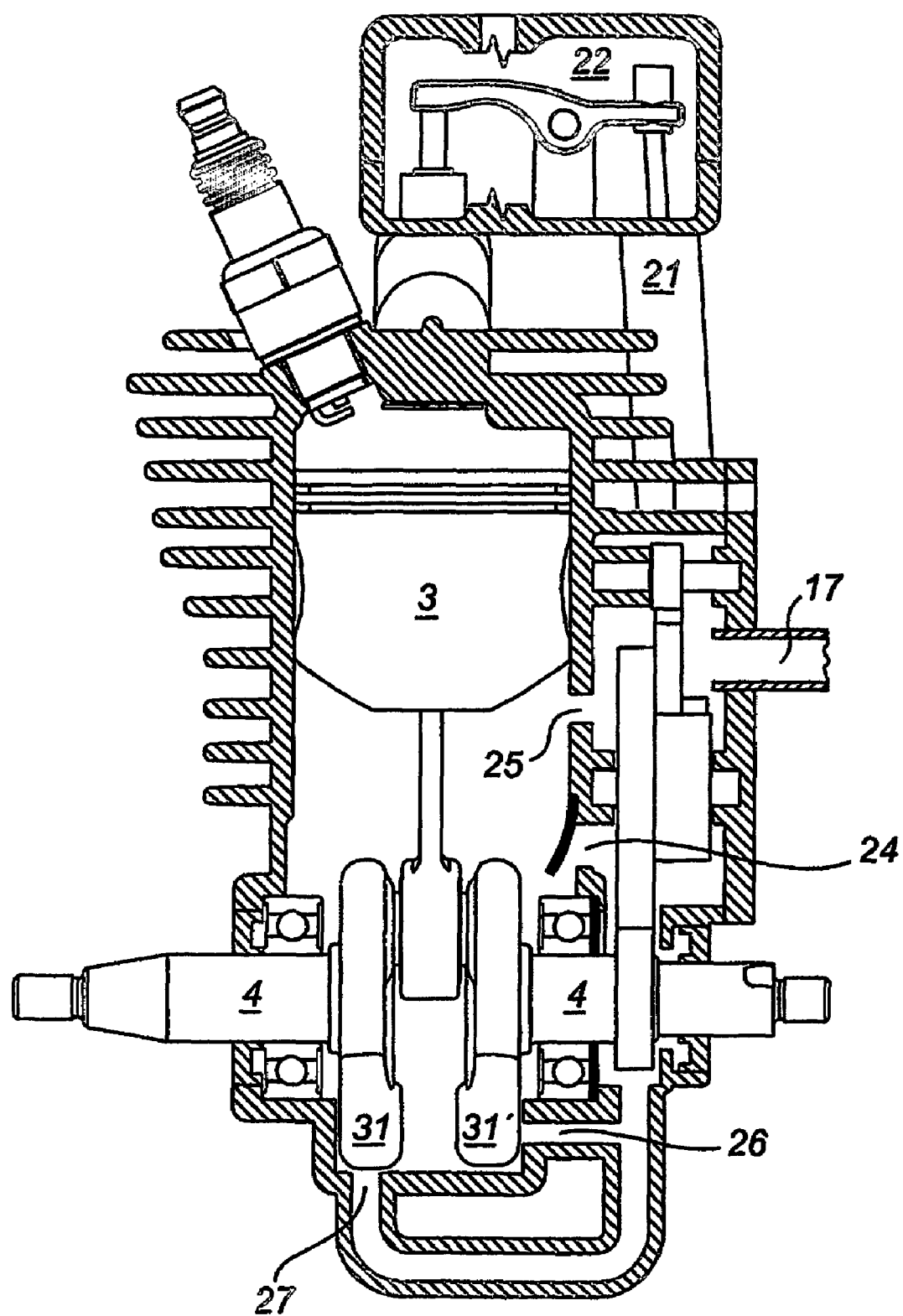
FIG. 4B shows a number of different small size passages controlled by valves, and a further alternative arrangement of the connecting duct 17

FIG. 4B shows a number of different passages that use valves and are therefore opened and closed. The passage 24 connecting the crankcase volume and the lubricating place constituted by the valve drive assembly housing, 19, 20, 21, 21', 22 is provided with a check valve. This check valve can be arranged to allow flow only into the valve drive assembly housing. It can also be arranged to allow flow only from the valve drive assembly housing. Usually it is in either case combined with another small size passage that is either free from valve or controlled by a valve. This also applies for the passages 25, 26 and 27. The passage 25 is controlled by the piston 3, so that it is opened and shut by the piston during every stroke of the piston. The passage 26 is controlled by an axial surface of the crank mechanism 31'. By comparison with FIG. 3B it is evident that the passage 26 will be opened and shut during every revolution of the crankshaft. The crank mechanism therefore forms a rotary valve opening and shutting with possibly down to half the frequency of the opening and shutting provided by the piston for passage 25. The rotary valve control can therefore provide more possibilities for the control. Another example of a rotary valve controlled passage is passage 27, which is controlled by the peripheral outer radius of crank mechanism 31. If the connecting duct 17 would be connected directly to the crankcase or cylinder and not as shown then the valve drive assembly housing would be in communication exclusively with the crankcase volume 12 and the possibilities outlined above would be solely for arranging an efficient lubrication of the valve drive assembly. But when the connecting duct 17 is attached as shown the situation is somewhat more complicated. Mixture need to reach both the crankcase volume 12 and the different sections of the valve drive assembly housing. The piston ported passage 25 and the rotary valve controlled passages 26 and 27 admit flow in both directions and can therefore be used separately or possibly in combination. Different types of valves can be combined, e.g. the check valve passage 24 and the piston ported passage 25. By adapting the axial position of the passage 25 back spit can be reduced or maybe even hindered.

Figure 5A:
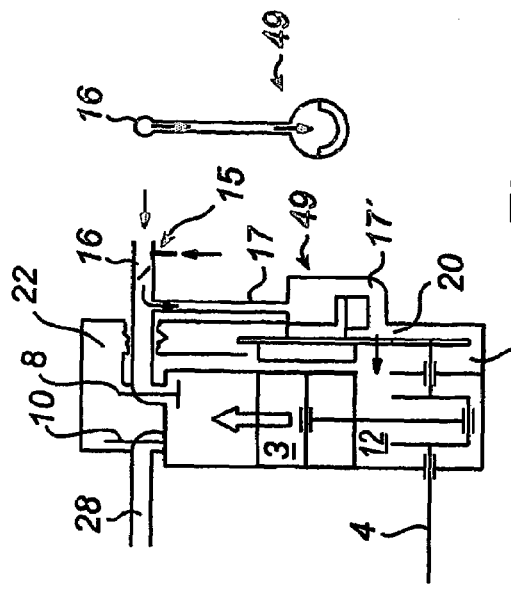
FIG. 5A-5D show in schematic cross-section views four different phases of the engine at work to illustrate lubrication of the main parts.
Figure 5B:
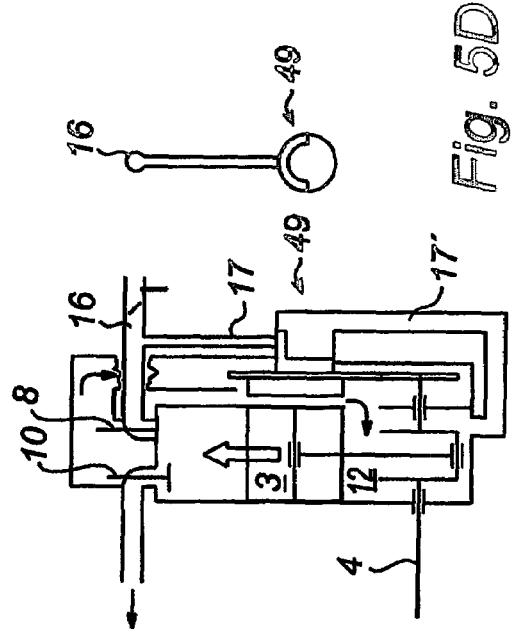
Figure 5C:
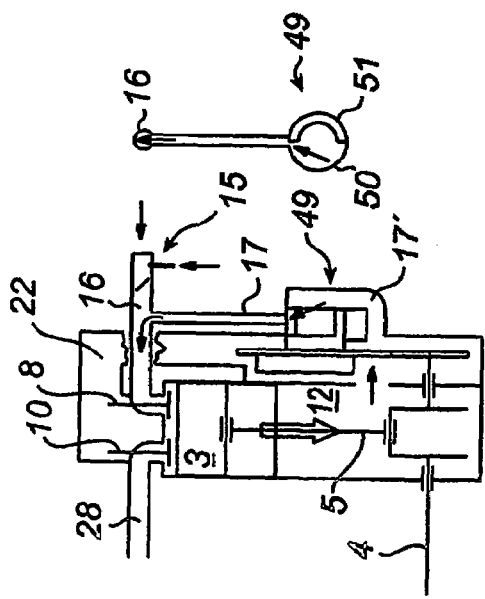
Figure 5D:
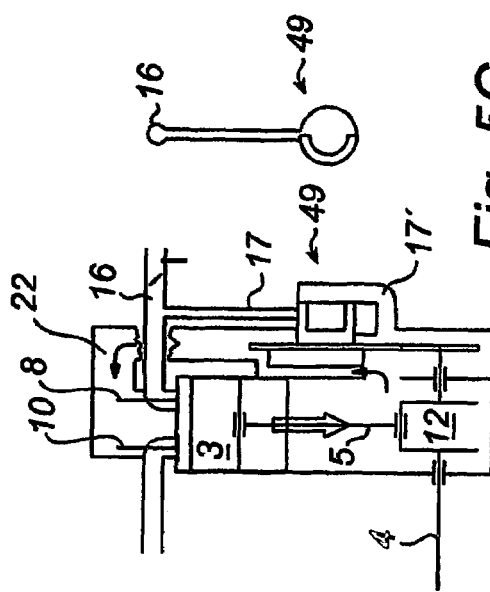

FIG. 5A-5D show schematic sketches of an OHV engine very similar to the engine shown in FIG. 4A. It has a rotary valve 49 arranged on the camshaft outside of the valve assembly housing 19, 20. The rotary valve consists of a valve housing 50 with a radial inlet for the connecting duct 17 coming from the intake channel 16 and an axial outlet for the connecting duct 17' leaving the valve housing to connect either to the valve assembly housing as shown in FIG. 5A-C or connect to the crankcase or cylinder, as shown in FIG. 5D. In the valve housing 50 a valve rotor 51 is rotatably journalled and driven by the camshaft in its speed. The valve rotor 51 has a "half-moon" shape or similar. Of course the valve geometry can be altered in wide ranges to obtain a good lubrication of the engine. The small picture to the right shows that the rotary valve 49 has just opened.

In FIG. 5A the intake valve 8 is open and the piston 3 is moving downwards. Air, fuel and lubricant is drawn from the carburettor 15 through the intake channel 16 into the cylinder. Mixture is also drawn from the crankcase volume 12 through the valve drive assembly housing 19, 20 and through the connecting duct 17' and 17 into the intake channel 16 and into the cylinder.

FIG. 5B shows the end of the intake into the cylinder. The compression stroke is starting and the intake valve 8 is closing. This will draw mixture from the carburettor 15 through the connecting duct 17 and 17' into the crankcase volume 12, as the rotary valve is fully open.

FIG. 5C shows the expansion stroke wherein the piston 3 is forced downwards and the rotary valve is closing. The pressure increase in the crankcase volume 12 makes mixture flow in all sections of the valve assembly housing thus lubricating the valve gear. But as the rotary valve has closed there will be no back flow in the connecting duct 17, 17'. Thus back spit of mixture to the carburettor and air filter is avoided. So when the piston is moving downwards from the FIG. 5A position the rotary valve is open while it is closed when the piston is moving downwards from the FIG. 5C position. This important feature is due to the fact that the rotary valve rotor 51 rotates with the same speed as the camshaft and therefore back spit can be avoided in the expansion stroke according to FIG. 5C. A check valve or a rotary valve driven at the speed of the crankshaft would be open both in the FIG. 5A position, that is necessary for the operation, and in the expansion stroke, i.e. 5C position, that is unwanted and would create back spit. There is therefore a distinct advantage for the camshaft driven rotary valve compared to the other valve types mentioned. The important thing is that the valve 49 opens and shuts once per engine cycle. This could as described be accomplished by a rotary valve driven by the camshaft. The valve could also be constituted by parts driven by the camshaft or driven at the same speed as the camshaft, i.e. half the speed of the crankshaft also in other ways. An example is a valve made up by a small piston driven back and forth in a valve housing, e.g. by a link mechanism.

There is of course also a possibility to try to slow down and decrease back spit without using a valve. In this case the connecting duct is connected either to the crankcase or cylinder or to the valve drive assembly housing, preferably to a lower section 19 or 20 of the housing as this will increase lubrication of the sensitive crank mechanism. Ways to decrease back spit without using a valve is e.g. to make the connecting duct point away from the carburettor in the junction or to put baffles in the intake channel 16 upstream of the junction. These baffles should preferably make more resistance to back flow than to forward flow thanks to good aerodynamic design.

FIG. 5D shows the exhaust stroke wherein the rotary valve is closed. There is only a flow in the valve assembly housing towards the crankcase volume 12. By way of example the connecting duct 17' is connected to the crankcase or cylinder.

The engine described in FIG. 1-5 uses a push rod arrangement for the valve control. It is a so called OHV-engine. But the principles described for lubricating the valve drive assembly housing 19, 20, 21, 21', 22 can also be used for other types of valve drive assemblies. Instead of gear wheels 29 and 39 two corresponding chain sprockets could be used connected with a chain. The higher sprocket would be supplied with a cam 40. In this way the cam 40 could be located higher up in the engine to shorten the push rods 37, 37' or to eliminate them. It is also possible to use gear wheels located between gear wheels 29 and 39 to accomplish the same result. The engine could also be of a so called side valve type. The cam followers 41, 41' could in this case control the valves directly.

So the described invention can be used for different kinds of four-stroke engines like an OHV-engine, a side valve engine and an OHC-engine, as described below. Also many different versions of each engine type can use the invention. A few examples only are given.

Figure 6:
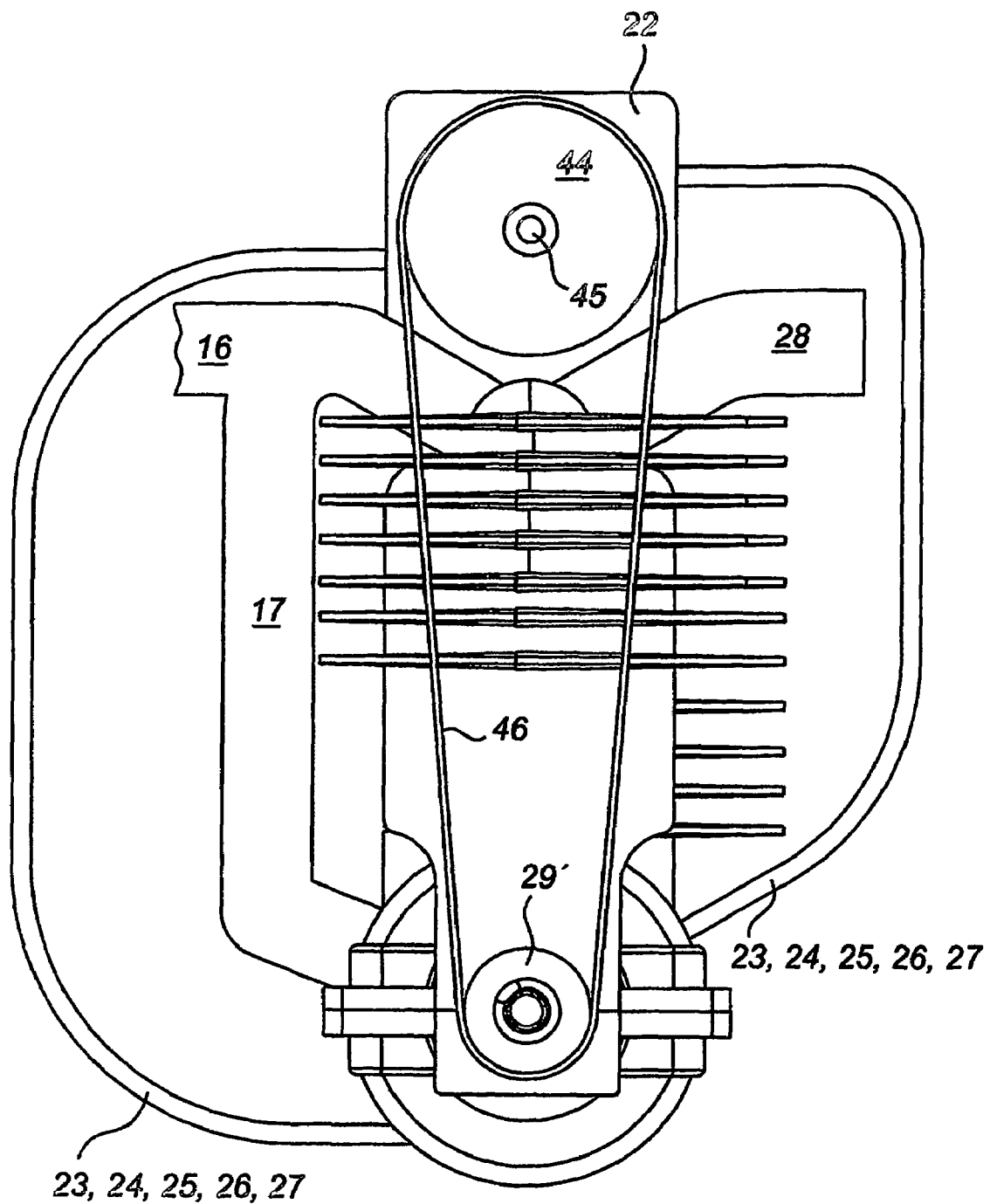
FIG. 6 shows an alternative embodiment of a four-stroke engine having an overhead camshaft, an OHC-engine.

FIG. 6 shows an engine with a camshaft 45 located above the valves and controlling them, either directly or via rocker arms. This is a so called OHC-engine. It uses a pulley 29' and a pulley 44 connected by a toothed belt 46. This is a conventional design and is therefore not further described. As the belt should not be lubricated it is possible to use a valve drive assembly housing comprising only a top section 22. This housing section 22 is in communication with the crankcase volume through at least one small size passage. Many alternatives are possible. There could be only one passage 23 free of valves. This passage can be supplemented by another passage using a check valve 24 or a piston ported valve 25 or a rotary valve 26 or 27 as described in FIG. 4b. But in this OHC-embodiment the connecting duct 17 is connected to the crankcase or cylinder and preferably controlled by a valve as described before, but valveless could also be possible. Different combinations including two passages free of valves 23 are possible as well as different combinations of passages using a valve. Using a passage with a valve can increase the flow of air and lubricant to the top section 22.

FIG. 7 shows schematically a further alternative embodiment of an OHC-engine. It has a valve drive assembly housing that does have more than a top section 22, namely lower sections 19 and 20. The top section and its parts are lubricated by a mixture flow through the lower parts. This and the rotary valve 49' is similar to the system described in FIG. 5A-5D.

The rotary valve 49' also has a "half-moon" shaped rotor driven by the camshaft. In this case the two ducts 17 and 17' connect radially to the rotary valve housing. Arrows show the lubrication flow. The flow takes place as described in FIG. 5A-5D. The connecting duct 17' coming from the rotary valve 49' could also connect to the crankcase or cylinder.

FIG. 8 shows a still further embodiment of an OHC-engine. It has a short connecting duct 17 entering into the top section 22 of the valve drive assembly housing, and a rotary valve connecting this flow with the lower sections 19 and 20. The rotary valve is almost identical with the one described in FIG. 5.

FIGS. 9A and 9B show an OHV-engine, comparable to the engine of FIG. 1-5. An intake duct 47 has been added connecting to the cylinder 2. It is piston ported. It could also connect to the crankcase and be supplied with a check valve. The intake duct 47 is supplied with a mixture preparation device 15 to supply at least air 13 and lubricant 14 to the crankcase volume 12. Fuel could be supplied separately to the intake channel 16 or to the cylinder. Preferably the mixture preparation device 15 is in the form of a carburettor or a low-pressure injection system providing an air-fuel-lubricant mixture to the crankcase volume 12. A valve 52 is arranged upstream of the junction with connecting duct 17. The valve 52 is controlled essentially in synchronism with the throttle valve of the mixture preparation device 15. This is preferably arranged through a link, that is however not shown.

FIG. 10A-10D show schematically four different phases of an engine similar to FIGS. 9A and B at work. The schematic engine has a rotary valve driven by the camshaft. This has the advantages described referring to FIGS. 5A-5D.

Figure 10A:
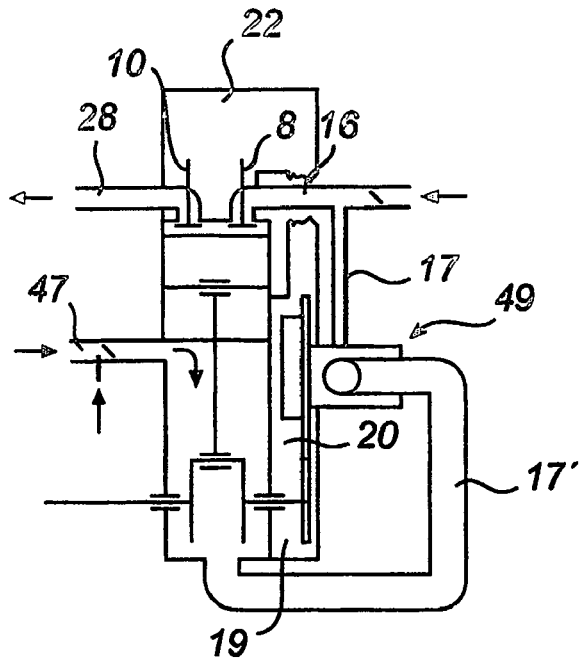
FIG. 10A-10D show in schematic cross-section views four different phases of an engine similar to the FIGS. 9A and 9B engine at work in order to illustrate mixture flow and lubrication.
Figure 10B:
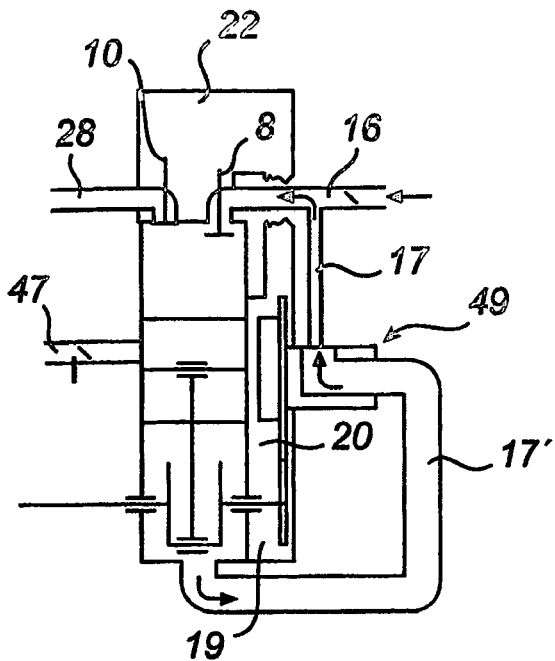
Figure 10C:
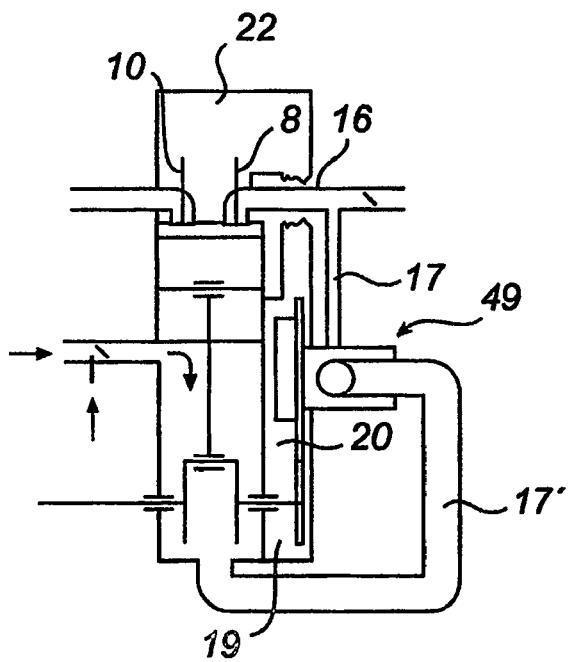
Figure 10D:
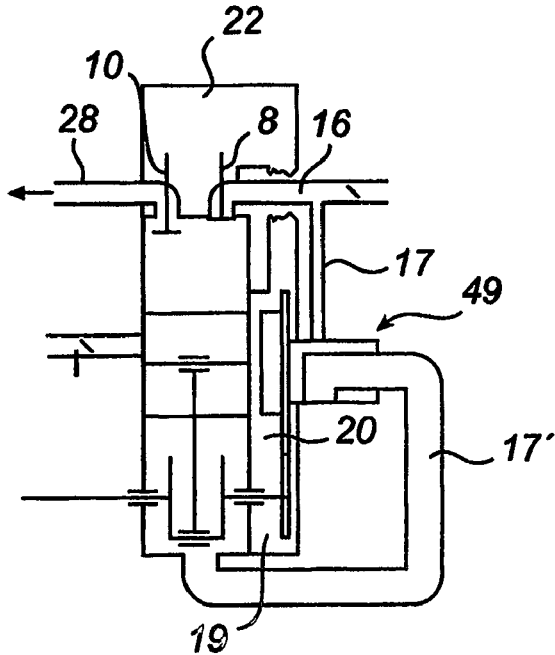

When the piston moves upwards during the exhaust stroke, see FIG. 10A, and during the compression stroke, see FIG. 10C, mixture is drawn into the crankcase volume 12. When the piston 3 moves downwards during the intake stroke, see FIG. 10B, the mixture is transferred through the open rotary valve 49 into the intake channel 16 and into the cylinder. Lubrication of the valve drive assembly housing 19, 20, 21, 21' and 22 is similar as described for FIGS. 5A-5D.

The invention claimed is:

1. A four-stroke engine (1) comprising:
   a cylinder (2);
   a piston (3) movably mounted in the cylinder in order to rotatingly drive a crankshaft (4) via a connecting rod (5);
   the cylinder and the piston conjointly delimiting a combustion chamber (6); the cylinder having an intake opening (7) and an intake valve (8) for opening and closing the intake opening;
   the cylinder having an exhaust opening (9) and an exhaust valve (10) for opening and closing the exhaust opening, followed by an exhaust duct (28);
   a mixture-preparation device (15) for supplying an air/fuel-lubricant mixture or for supplying in two steps an air/lubricant mixture and an air/fuel mixture;
   a crankcase (11) connected to the cylinder and delimiting together with the underside of the piston (3) a crankcase volume (12), to which at least air (13) and lubricant (14) is supplied by the mixture preparation device;
   an intake channel (16) connecting to the intake opening (7) with intake valve (8) to supply to the intake at least air;
   a valve drive assembly (18) driven by said crankshaft (4) for actuating the intake valve (8) and the exhaust valve (10), characterized in that it further comprises:
   a valve drive assembly housing (19, 20, 21, 21', 22) comprising one or more sections (19, 20, 21, 21', 22), and the intake channel (16) is supplied with a connecting duct (17) communicating with the crankcase volume (12) either by being connected to the crankcase or cylinder, or by being connected to the valve drive assembly housing (19, 20, 21, 21', 22), which communicates with the crankcase volume (12), and the communication from the intake channel (16) to the crankcase volume is arranged through at least one valve (49) that opens and shuts only once per engine cycle.

2. A four-stroke engine (1) according to claim 1, wherein the intake channel (16) is supplied with the mixture preparation device (15) to supply at least air (13) and lubricant (14) to the intake and to the connecting duct (17).

3. A four-stroke engine (1) according to claim 2, wherein the mixture preparation device (15) is in the form of a carburettor or a low-pressure injection system providing an air-fuel-lubricant mixture to the intake and the connecting duct (17).

4. A four-stroke engine (1) according to claim 1, wherein the at least one valve (49) is constituted by parts driven by the cam shaft or driven at the same speed as the cam shaft, i.e. half the speed of the crankshaft.

5. A four-stroke engine according to claim 4, wherein the valve is a rotary valve (49).

6. A four-stroke engine according to claim 1, wherein atop section (22) of the valve drive assembly housing is in flow connection only with a lower section (21, 20) and therefore there is no flow from the crankcase via a lower section (19, 20) of the valve drive assembly housing to the top section (22) and further via the intake channel (16) to the combustion chamber.

7. A four-stroke engine (1) according to claim 1, wherein the connecting duct (17) is connected to the crankcase (11) or cylinder (2), and the valve drive assembly housing (19, 20, 21, 21', 22) is in communication exclusively with the crankcase volume (12).

8. A four-stroke engine (1) according to claim 1, wherein the section/s (19, 20, 21, 21', 22) is/are separate from the crankcase volume but in communication with the crankcase volume through at least one passage (23, 24, 25, 26, 27).

9. A four-stroke engine (1) according to claim 8, wherein the at least one passage (23) is free from valves.

10. A four-stroke engine (1) according to claim 9, wherein there is only a single passage (23) free from valves.

11. A four-stroke engine (1) according to claim 8, wherein the at least one passage (24) or duct connecting the crankcase volume and the valve drive assembly housing (19, 20, 21, 21', 22) is provided with a check valve.

12. A four-stroke engine (1) according to claim 11, wherein the check valve is arranged to allow flow only into the valve drive assembly housing.

13. A four-stroke engine according to claim 11, wherein the check valve is arranged to allow flow only from the valve drive assembly housing.

14. A four-stroke engine (1) according to claim 8, wherein the at least one passage (25) is opened and shut by the piston (3).

15. A four-stroke engine according to claim 8, wherein the at least one passage (26, 27) is controlled by a rotary valve.

16. A four-stroke engine (1) according to claim 8, wherein the at least one passage (23, 24, 25, 26, 27) is of small size and has a combined cross-section area smaller than the cross-section area of an aperture with a diameter of 40% of the cylinder diameter, and preferably of 30% of the cylinder diameter.

17. A four-stroke engine (1) according to claim 8, wherein the at least one passage (23, 24, 25, 26, 27) is of small size and has a combined cross-section area smaller than the cross-section area of an aperture with a diameter of 20% of the cylinder diameter, and preferably of 10% of the cylinder diameter.

18. A four-stroke engine (1) according to claim 1, wherein an intake duct (47) is added connecting to the crankcase or cylinder and supplied with a mixture preparation device (15) to supply at least air (13) and lubricant (14) to the crankcase volume (12).

19. A four-stroke engine (1) according to claim 18, wherein the mixture preparation device (15) is in the form of a carburettor or a low-pressure injection system providing an air-fuel-lubricant mixture to the crankcase volume (12).

20. A four-stroke engine (1) according to claim 15, wherein the rotary valve is constituted by the crank mechanism (31, 31').

* * * * *